United States Patent [19]

Popovic

[11] Patent Number: 4,660,249

[45] Date of Patent: Apr. 28, 1987

[54] SUCTION DEVICE

[76] Inventor: Stojan Popovic, John Bergsplan 5/I, S-112 50 Stockholm, Sweden

[21] Appl. No.: 590,586

[22] PCT Filed: Jul. 7, 1983

[86] PCT No.: PCT/SE83/00277

§ 371 Date: Mar. 2, 1984

§ 102(e) Date: Mar. 2, 1984

[87] PCT Pub. No.: WO84/00315

PCT Pub. Date: Feb. 2, 1984

[30] Foreign Application Priority Data

Jul. 7, 1982 [SE] Sweden ............... 8204204

[51] Int. Cl.[4] .................... B23K 1/02; A47L 5/02
[52] U.S. Cl. ........................ 15/341; 15/344; 228/20; 335/261
[58] Field of Search ............ 15/344, 341; 228/20; 335/261, 279

[56] References Cited

U.S. PATENT DOCUMENTS

| | | | |
|---|---|---|---|
| 2,096,763 | 10/1937 | Ray et al. | 335/261 X |
| 2,829,319 | 4/1958 | McCleskey | 335/261 X |
| 2,960,591 | 11/1960 | Brillinger | 219/230 X |
| 3,163,145 | 12/1964 | Duhaime et al. | 219/230 X |
| 4,206,864 | 6/1980 | Rauchwerger | 15/341 X |

Primary Examiner—Chris K. Moore

[57] ABSTRACT

A suction device, particularly intended for use as a soft-solder suction device in soldering operations. The suction device includes a housing (1) having a cylindrical chamber (2) and a suction pipe (11) connected to one end of the chamber. Arranged for axial movement in the chamber is piston (4). The piston is arranged to move extremely rapidly through the chamber, from a starting position located adjacent the suction pipe, in response to the release of a force acting automatically upon the piston. This piston movement creates a subpressure, which results in an effective suction effect at the tip of the suction pipe (11). In order to enable the suction device to be held absolutely still when movement of the piston (4) is initiated, the piston is arranged to be operated electromagnetically. The electromagnetic force is initiated by means of a switch which is separate from the suction device and which is foot-operated or arranged to be operated by some other part of the body. In order to simplify cleaning of the suction device, and to extend the intervals at which consecutive cleaning operations need be carried out, the suction pipe (11) is provided with a conically tapering suction channel (12).

5 Claims, 1 Drawing Figure

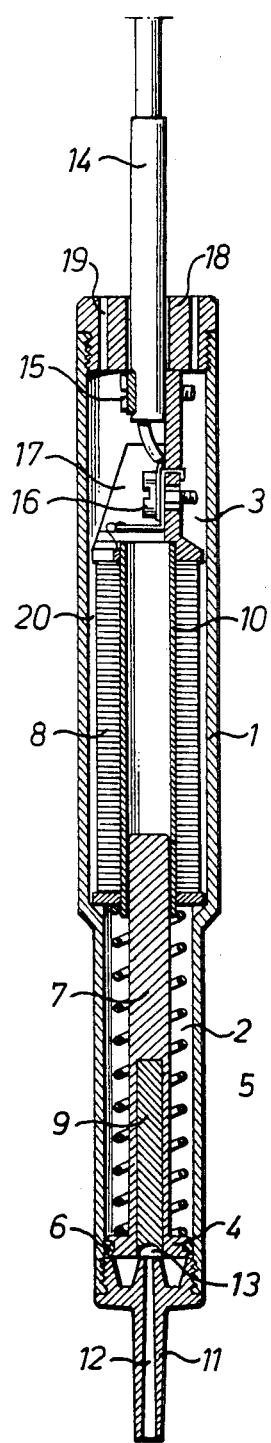

SUCTION DEVICE

TECHNICAL FIELD

The present invention relates to a suction device, and particularly, although not exclusively, to a suction device intended for use as a soft-solder suction device in soldering operations, said device comprising a housing having a cylindrical chamber and a suction pipe connected to one end of the chamber; and a piston which is arranged to be moved in the chamber at a high speed therethrough, from a starting position located adjacent the suction pipe, by means of a force which acts automatically on the piston when said force is released, the movement of said piston through the housing creating a subpressure which creates an effective suction effect at the tip of the suction pipe.

BACKGROUND ART

Soft-solder suction devices of this kind are used, inter alia, for connecting components to circuit cards or boards. In the case of circuit cards or circuit boards, it is important that the molten solder does not spread on the card or board, since this may cause short-circuiting between the closely packed components. In this respect, when effecting a soldering operation the workman manoeuvres a soldering iron, or like tool, with one hand, while holding a soft-solder suction device in his/her other hand, with the tip of the suction device located close to the soldering location. Immediately the soft solder has been brought to a molten state, with the aid of the soldering iron, the suction device is activated by releasing the piston, whereupon surplus solder is automatically drawn into the suction pipe. In order for this operation to be successful, it is extremely important that the suction device is held steady and in the correct position of alignment with respect to the soldering location, when the piston is released.

In the majority of soft-solder suction devices of the aforesaid kind used today, the piston is driven through the cylinder by the force of a spring. This mode of operation has a number of serious drawbacks and disadvantages. Among other things, the use of a spring means that the piston must be moved manually to its starting position, i.e. cocked, prior to each suction operation, while tensioning the spring. This constitutes an interruption in the smoothness of the soldering work. Furthermore, the task of manually cocking the piston can be a relatively difficult one to carry out, since a relatively large force must be applied to tension a spring of the strength required to move the piston at a speed sufficient to generate an effective suction effect.

Consequently, this manual cocking of the piston sets a limit on the strength of the spring that can be used.

A more serious drawback is that in order to release the spring force, so as to draw up excess solder, it is necessary to move the hand holding the suction device, which unavoidably results in some small movement of the device. This movement is liable to cause such misalignment of the device that not all of the molten solder is drawn into the suction pipe. Misalingment of the device can also be caused by the recoil action of the piston, when said piston is released. The use of a spring also results in irregular movement of the piston, since the piston is rapidly retarded as the spring force decreases, towards the end of the piston stroke. Consequently, this results in an irregular suction effect.

In an attempt to eliminate these disadvantages and drawbacks encountered when using a spring in accordance with the aforegoing, it has been suggested that a soft-solder suction device is connected to a suction vessel. Because of the limited subpressures attainable in practice, and because of the volume of the requisite suction lines, the proposed arrangement does not produce a sufficiently powerful suction effect immediately the suction device is activated.

A further disadvantages with known molten-solder devices of the kind mentioned in that molten solder is sucked into the path travelled by the piston, where the solder fastens and impairs the seal between piston and cylinder. Thus, these known devices must be cleaned quite frequently, which is a time-consuming task, since in order to be cleaned the device must be stripped down, causing interruptions in productivity.

DISCLOSURE OF THE INVENTION

The main object of the invention is to provide a soft-solder suction device of the aforementioned kind with which, inter alia, the problem of holding the device steady, in a desired position, when releasing the piston is solved.

Another object of the invention is to provide a suction device which does not need to be cleaned as often as prior known devices of the kind described, and which can be cleaned more readily than the known devices, and which can therefore be used more satisfactorily in practice.

The main object of the invention is achieved by the fact that the piston of a soft-solder suction device of the kind described is operated electromagnetically. Among other things, this means that the suction device will always be ready for use, without first needing to be cocked or primed; that the force acting on the piston can be selected without requiring attention to the manual tensioning of a spring; that the piston will move smoothly, without appreciable recoil action; and that as a result of this smooth piston movement, a substantially continuous suction effect is obtained during the entire duration of piston movement in the cylinder.

Preferably, the electromagnetic force activating the piston is released by means of a switch which is located separate from the suction device and which is arranged to be operated by the foot of the workman, or by some other part of the body. This enables the workman to concentrate on holding the suction device steady, in alignment with the soldering location.

This electromagnetic operation of the piston is effected by providing the piston with a piston rod which is made of magnetic material and which is arranged to be drawn into at least one elongate, cylindrical coil, when current is passed through the coil winding. As the piston rod is suitably fitted with a coil spring, intended, inter alia, for returning the piston to its starting position upon completion of a suction operation such a piston rod, due to the resistance exerted by the spring, will not be drawn fully into the coil, which means that the length of the coil must be made greater than would otherwise be necessary.

According to the present invention this can be eliminated by strengthening the electromagnetic force acting on the piston rod, particularly during the latter part of the working stroke of the piston. In this latter respect, the free, inner part of the piston rod is suitably made of a soft magnetic material, while the rear portion of the piston rod comprises a hard magnetic material which can serve as a permanent magnet and increase the force acting on the piston. The hard magnetic material suitably extends over substantially half of the length of the piston rod.

For the purpose of eliminating the aforementioned disadvantages encountered with known soft-solder suction devices with respect to cleaning and associated problems, the suction device according to the invention is preferably provided with a suction pipe having a conically, tapering suction channel. When drawn into such a channel, the droplets of molten solder will be thrown against the walls of the tapering channel, where they are cooled and fasten to said walls. The coating formed on the walls of the channel can be readily withdrawn from the pipe at regular intervals, in the form of a single-piece shell, this removal being facilitated by the conical shape of said suction channel. Thus, this cleansing operation can be affected without dismantling the device. Consequently, only a very small amount of solder will be drawn into the cylindrical chamber. In order to prevent any solder entering the chamber from forming a coating on the walls of the cylinder, the end of the suction pipe facing the piston is conveniently provided with a recess, in which said solder collects. This solder can readily be removed, and it should be observed that a relatively long period of time is required before the solder builds up to an extent which requires its removal.

In accordance with one embodiment of the invention, a current pulse is only supplied to the coil when the piston is to be moved in the cylinder. This enables the coil winding to be under-dimensioned, thereby decreasing the dimensions of the coil, without risk of the winding being overheated. Consequently, the amount of heat developed in the winding is, on average, moderate. This also greatly reduces the amount of energy consumed.

BRIEF DESCRIPTION OF THE DRAWING

The invention will now be described in more detail with reference to the accompanying drawing, the single FIGURE of which is a longitudinal sectional view of a soft-solder suction device according to the invention, with the piston of said device located in its starting position.

BEST MODE OF CARRYING OUT THE INVENTION

The drawing shows a housing 1 having a forwardly located, cylindrical chamber 2 and a rearwardly located, cylindrical chamber 3. Arranged for axial movement in the forward chamber 2 is a piston 4, which is acted upon by a coil spring 5, the piston 4 being illustrated in its starting position. The piston 4 is provided with a peripherally extending sealing ring 6. For the purpose of driving the piston 4, the piston is provided with a piston rod 7 made of magnetic material, the piston rod, in the illustrated position, projecting slightly into an elongate magnetic coil 8.

The free, inner portion of the piston rod 7 comprises a soft magnetic material, i.e. iron having a carbon content beneath 0.05%, while the outer or rearward part of the piston includes a core 9 of hard magnetic material, i.e. steel. In the illustrated embodiment, the core 9 extends along substantially half the length of the piston rod 7. The piston rod is arranged for axial movement in a tube 10 which is arranged in the coil 8 and to which, for practical reasons, the inner end of the spring 5 is attached.

Arranged in the front end of the forwardly lying chamber 2 is a suction pipe 11. The pipe 11 is relatively long and is provided with a through-passing suction channel 12, which tapers substantially conically towards the chamber 2. The surface of the piston 4 facing the suction pipe 11 is provided with a recess 13, in which solder can collect.

For the purpose of activating the coil 8, the coil is connected, via a conductor 14, to a switch means (not shown), which is arranged to supply a current pulse of suitable duration to the coil 8, each time the switch means is activated. This enables the coil to be under-dimensioned, since it need not withstand a continuously applied current load. This, together with the fact that the length of the coil 8 can be shorter than would otherwise be necessary, due to the fact that the magnetic force is amplified with the aid of the hard magnetic material 9, enables the device to be constructed with dimensions which render it suitable for practical use.

The reference 15 identifies a means for relieving the load on the conductor or line 14, while 16 identifies a connector screw. A corresponding screw is arranged on the opposite side of an insulating screen or shield 17.

At its rearward end, the housing 1 is closed by means of a closure means 18, which is provided with passages 19 for permitting air to pass into and out of the housing 1 respectively, in dependence upon the movement of the piston 4. In this respect, the reference 20 identifies passages which are located adjacent the outer surfaces of the coil 8 and which place the forward chamber 2 in communication with the rearward chamber 3.

A soft-solder suction device according to the above can be used extremely easily, since the operation is able to hold the device completely still, in a firm grip with one hand adjacent the soldering location. It is not necessary for the operator to change his grip when initiating movement of the piston, and each operator can himself choose a suitable grip for each individual working operation, since the accessibility of a release button on the suction device itself need not be taken into account. Furthermore, the piston 4 will always occupy a position of readiness, without needing to be moved manually to its starting position against the action of a spring. This will provide an increase in productivity, since all the operator is required to do with each soldering operation is to momentarily make a switch, for example which may be a foot-operated switch, a knee-operated switch or a mouth-operated switch, whereupon a d.c. current pulse is supplied to the coil 8. The winding of the coil 8 and the magnitude of the current pulse are, in this respect, so balanced in relation to one another as to obtain a high tension force on the piston rod 7, capable of drawing the piston rod into the tube 10 arranged in the coil 8.

Since initially only a small part of the piston rod 7 of magnetic material is located in the coil 8, the piston 4 will begin to move relatively smoothly, without any appreciably recoil action. The piston, however, will reach a high speed very quickly, creating the requisite suction effect at the mouth of the suction pipe 11. In order to increase the magnetic force acting upon the piston rod 7 as the resistance to piston movement exerted by the spring 5 under compression increases, there is provided a core 9 of hard magnetic material in the rear part of the piston rod 7. This core will act as a self-magnetizing permanent magnet each time the suction device is used. When such a core is used, substantially all of the piston rod 7 is drawn powerfully into the coil 8, while compressing the spring 5. The spring 5, however, together with the air cushion created between the piston 4 and the coil 8 will gently brake the movement of the piston. When the coil 8 is denergized, the spring 5 will return the piston 4 to the illustrated starting position. This returning movement of the piston also takes place gently, under the action of air forced through the pipe 10 as the piston returns. During the return movement of the piston, cooling air is also drawn through the passages 19 arranged in the closure means 18 at the rear of the device.

The major part of the solder drawn into the suction pipe 11 during a suction operation will be thrown against and fasten onto the wall of the through-passing channel 12. As beforementioned, the coating subsequently formed on the wall of the channel can, after the device has been in use for some time, be readily removed in the form of a shell, which can be withdrawn from the channel with the aid of a hook or like implement. A very small part of the solder drawn into the pipe 11 will pass into and fasten onto the piston 4. The major pat of this solder will collect in the recess 13, from which it can be readily removed when removing the pipe 11. This need not be done, however, until the device has been in use for a longer period of time.

According to the invention, the pipe 11 is used as a collecting vessel, which has not been possible with previously used, relatively short suction pipes provided with rectilinear channels. For example, when channels of this latter nature are used, the major part of the solder will be drawn into the suction chamber, where it is liable to damage the seal between piston and cylinder. The task of cleaning such a device is consequently difficult and time-consuming.

The invention is not restricted to the aforedescribed and illustrated preferred embodiment, but can be modified in several respects within the scope of the claims. For example, the piston rod, and in particular the combination between soft magnetic and hard magnetic material can be modified in dependence upon the effect required. For example, the hard magnetic material need not have the form of a core, but may comprise a complete part of the piston rod. The channel 12 extending through the suction pipe 11 may have a form other than a purely conical form, although it is important that the channel affords a throttling effect. As will be understood, the suction deice according to the invention is not restricted to use with soft solder, but can be used in any other connection where a corresponding effect is required.

I claim:

1. A suction device, particularly intended for use as a soft-solder suction device in soldering operations including: a housing having a cylindrical chamber; a suction pipe connected to one end of the chamber; and a piston which is arranged for axial movement in said chamber and which is arranged to be moved from a starting position located adjacent the suction pipe rapidly through the chamber upon release of a force which acts automatically upon the piston, said movement of said piston creating a sub-pressure which gives rise to an effective suction effect at the tip of the suction pipe; said piston being arranged to be driven by an electromagnetic force initiated by means of a switch which is separate from the suction device; said piston being provided with a piston rod, and a restoring and dampening spring arranged around said piston rod, said piston rod being made of magnetic material, and arranged to be drawn into at least one elongate, cylindrical coil when current is caused to flow through the windings of said coil; said piston rod having an inner end located nearest said coil in its unactuated state comprised of soft magnetic material, and an outer end comprised of hard magnetic material; said piston rod being so comprised that the electromagnetic force acting on said rod during the latter part of the stroke will be strengthened so as to draw said rod fully into the coil against the force of the restoring spring to provide a substantially continuous suction effect during the entire duration of piston movement in the cylindrical chamber.

2. A suction device according to claim 1, characterized in that the hard magnetic material extends along substantially half the length of the piston rod.

3. A suction device according to claim 1, characterized in that the housing (1) is provided with suitably dimensioned holes, for permitting air to pass out of and into the housing respectively in conjunction with movement of the piston.

4. A suction device according to claim 1, characterized in that the suction pipe has a substantially conically tapering channel.

5. A suction device according to claim 1, characterized in that the surface of the piston facing the suction pipe is provided with a recess for collecting any solder which may be drawn in through the suction pipe.

* * * * *